J. H. OWEN.
CULTIVATOR-BLADES.
No. 194,531. Patented Aug. 28, 1877.
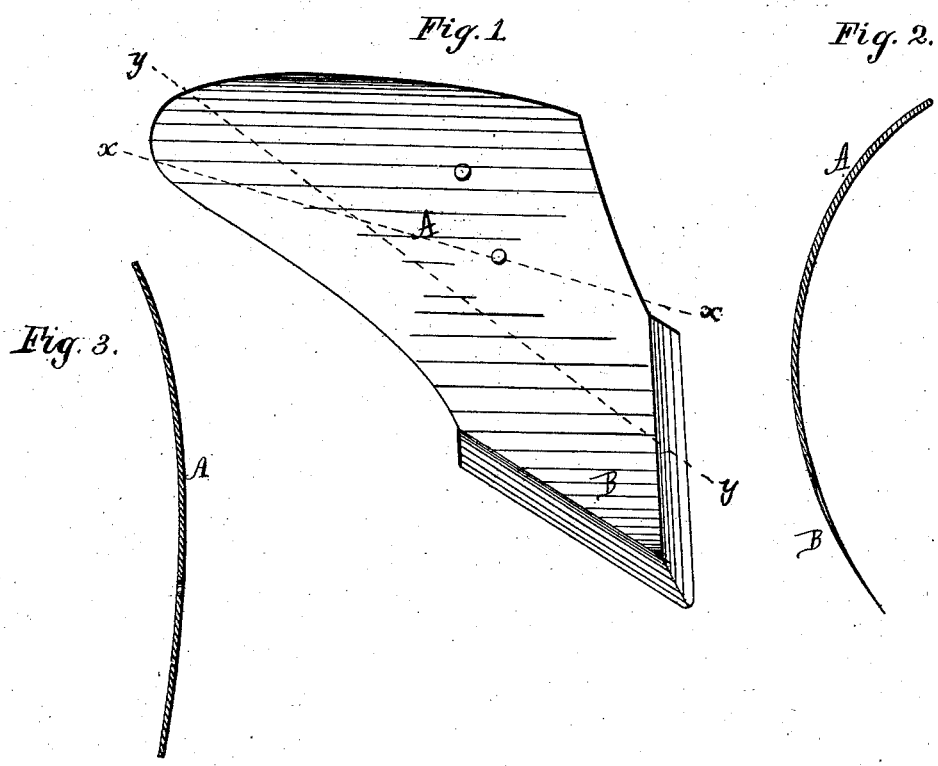
Witnesses:
Inventor:

UNITED STATES PATENT OFFICE.

JOHN H. OWEN, OF HUSTON, ILLINOIS.

IMPROVEMENT IN CULTIVATOR-BLADES.

Specification forming part of Letters Patent No. 194,531, dated August 28, 1877; application filed August 8, 1876.

*To all whom it may concern:*

Be it known that I, JOHN H. OWEN, of Huston, in the county of Adams and State of Illinois, have invented certain new and useful Improvements in Cultivator-Blades; and I do hereby declare that the following is a full, clear, and exact description of the same, reference being made to the accompanying drawings, forming a part of this specification, in which—

Figure 1 is a front view of my improved blade. Fig. 2 is a vertical section through the line $y$ $y$ of Fig. 1, and Fig. 3 a cross-section through the line $x$ $x$ of Fig. 1.

This invention relates to improvements in cultivator-blades, whereby the earth can be effectually stirred or turned over to cover all weeds, trash, &c., leaving the furrows clean, and throwing the earth to the corn, thereby performing the office of both cultivator and plow; and the invention consists in the special construction of the mold-board and blade formed in one piece, as will be hereinafter fully described.

A in the drawing represents the mold-board, and B the diamond-shaped cutting-blade. Said mold-board and blade are curved gradually their whole width from the extreme point of blade to the extreme top of mold-board, and the mold-board also curved gradually from side to side, forming a convex surface on its front side, all as shown in Figs. 2 and 3. These two curves, as above described, are very essential features in my construction, as they facilitate the throwing of the soil to one side, equalizing the draft of cutting-surface, and strengthening the blade.

I am aware that a shovel-plow having the mold-board, shares, and point formed in one piece, with the mold-board curved in the line of draft, and straight transversely, and also plows having the mold-board with a portion of its front surface convex, are old, and such I do not claim, broadly, as my invention; but

I claim as my invention—

The herein-described cultivator-blade, consisting of the mold-board A and diamond-shaped blade B, cast in one piece, curved gradually the whole width from the point of blade to the extreme top of mold-board, and also curved gradually transversely across the mold-board, thereby facilitating the throwing of the soil to one side, equalizing the draft of cutting-surface, and strengthening the blade, as specified.

JOHN H. OWEN.

Witnesses:
G. A. DOUGHERTY,
CHAS. A. MARSH.